(12) United States Patent
Patanian et al.

(10) Patent No.: US 6,785,633 B2
(45) Date of Patent: Aug. 31, 2004

(54) METHOD AND APPARATUS FOR ASSESSING PERFORMANCE OF COMBINED CYCLE POWER-PLANTS

(75) Inventors: John Jacob Patanian, Atlanta, GA (US); Jason Darrold Gayton, Chicago, IL (US)

(73) Assignee: General Electric Company, Schenectady, NY (US)

(*) Notice: Subject to any disclaimer, the term of this patent is extended or adjusted under 35 U.S.C. 154(b) by 119 days.

(21) Appl. No.: 10/028,935

(22) Filed: Dec. 28, 2001

(65) Prior Publication Data

US 2003/0125905 A1 Jul. 3, 2003

(51) Int. Cl.$^7$ .................. G06F 11/30; G06F 15/00; G21C 17/00
(52) U.S. Cl. .................. 702/182; 703/18; 700/23; 700/288; 290/404; 376/215; 376/254; 219/497
(58) Field of Search .................. 702/182; 703/18; 700/23, 288; 290/404, 40 R; 376/215, 254; 219/497

(56) References Cited

U.S. PATENT DOCUMENTS

| | | | |
|---|---|---|---|
| 3,879,616 A | * 4/1975 | Baker et al. .............. 290/40 R |
| 3,919,629 A | 11/1975 | Alliston | |
| 4,455,614 A | * 6/1984 | Martz et al. .............. 700/288 |
| 5,023,045 A | * 6/1991 | Watanabe et al. .......... 376/215 |
| 5,619,433 A | * 4/1997 | Wang et al. .............. 703/18 |
| 5,913,184 A | * 6/1999 | Girbig .................. 702/182 |
| 6,207,936 B1 | * 3/2001 | de Waard et al. .......... 219/497 |
| 6,339,629 B1 | 1/2002 | Takeuchi et al. | |
| 2003/0074163 A1 | 4/2003 | Anand et al. | |

* cited by examiner

Primary Examiner—John Barlow
Assistant Examiner—Aditya Bhat
(74) Attorney, Agent, or Firm—Nixon & Vanderhye P.C.

(57) ABSTRACT

A method of determining performance impact of individual components of a power plant on overall thermal performance of the power plant, the method including (a) designing a first thermal model of the power plant using original specification data of the power plant; (b) developing a second thermal model of the power plant from measured performance data of each component of the power plant; and (c) determining the performance impact of a selected component of the power plant on the overall thermal performance of the power plant by substituting design performance data of the selected component in the first thermal model with its measured performance data.

13 Claims, 6 Drawing Sheets

METHOD AND APPARATUS FOR ASSESSING PERFORMANCE OF COMBINED CYCLE POWER-PLANTS

FIELD OF THE INVENTION

This invention relates to combined cycle power plants. More particularly, it relates to a method and apparatus for assessing the thermal performance of individual components of a combined cycle power plant and determining the performance impact of each component on the overall thermal performance of the power plant.

BACKGROUND OF THE INVENTION

Combined cycle power plants utilize gas turbines as prime movers to generate power. Gas turbine engines operate on the Brayton Cycle thermodynamic principle and typically have high exhaust flows and relatively high exhaust temperatures. Exhaust gases, when directed into a heat recovery boiler (typically referred to as a heat recovery steam generator or HRSG), produce steam that can be used to generate more power by, for example, directing the steam to a steam turbine.

During early phases of power plant design, an engineer typically designs a thermal model of each major component of the power plant. For example, a thermal model of each of a gas turbine, steam turbine, HRSG, condenser, etc., may be built. In addition to designing a thermal model for each of the individual components, an overall thermal model combining individual thermal models may also be designed. This overall thermal model is designed to capture the interaction between the individual component models. It may also be used as a basis for thermal performance guarantees at a reference set of boundary conditions.

Demonstration of power plant performance is typically accomplished by conducting a performance test. As testing conditions are not likely to be identical to reference boundary conditions or conditions at performance guarantee conditions, results obtained at test conditions may have to be corrected to provide a true representation of the plant performance at the reference boundary conditions.

In one approach, test results are corrected using a set of curves generated by executing the overall plant thermal model and varying the boundary conditions one at a time. In the event of a performance shortfall, this approach may provide fairly accurate values for corrected power plant performance. This approach, however, provides no indication as to which component(s) of the power-plant is responsible for the performance shortfall.

In another approach, tools for providing diagnostic information on individual power-plant components may be used. However, these tools fail to address the need for diagnosing the overall performance of the combined cycle power plant.

Thus, there is a need to overcome the above-identified problems.

SUMMARY OF THE INVENTION

A system and a method for determining the performance impact of individual power plant components on the overall thermal performance of the power plant by assessing the thermal performance of individual components of the power plant.

Specifically, a plant thermal model is used to itemize the performance of individual equipment/components of a power plant. A thermal model of the power plant is initially designed from original power-plant specification documents. A second thermal model is then developed using measured performance data of individual components of the power plant built in accordance with requirements set forth in the original power-plant specification documents. The performance impact of each component of the power plant on the overall thermal performance of the power plant is then determined by substituting the design thermal performance data of each component with its measured thermal performance data. In this manner, the impact on the overall thermal performance of the power plant is determined by assessing the thermal performance of individual power plant components.

In one aspect, the present invention provides a method of determining performance impact of individual components of a power plant on overall thermal performance of the power plant, the method comprising (a) designing a first thermal model of the power plant using original specification data of the power-plant; (b) developing a second thermal model of the power plant from measured performance data of each component of the power-plant; (c) determining the performance impact of a selected component of the power-plant on the overall thermal performance of the power-plant by substituting design performance data of the selected component in the first thermal model with its measured performance data. Step (c) is repeated until the performance impact of each component of the power plant on the overall thermal performance of the power plant is determined. The method further comprises displaying the performance impact of each component on the overall thermal performance of the power plant. The step of designing a first power plant thermal model further comprises i) receiving original specification data in a computer system; and ii) processing the specification data to design the first thermal model. The step further includes the step of developing a second model including i) measuring performance data of each component of the power-plant using a data acquisition computer; ii) storing measured performance data in the data acquisition computer; iii) receiving the measured performance data from the data acquisition computer in a processor system; and iv) processing data received in the processor system to design the second thermal model.

In another aspect, an apparatus for determining performance impact of individual components of a power plant on overall thermal performance of the power plant, comprises means for designing a first thermal model of the power plant using original specification data of the power plant, means for developing a second thermal model of the power plant from measured performance data of each component of the power plant and means for determining the performance impact of a selected component of the power plant on the overall thermal performance of the power plant by substituting design performance data of the selected component in the first thermal model with its measured performance data. The apparatus further comprises means for repeating the determining step until the performance impact of each component of the power plant on the overall thermal performance of the power plant is determined, and means for displaying the performance impact of each component of the power plant on the overall thermal performance of the power plant. The apparatus also includes a means for receiving original specification data, means for processing the specification data to design the first thermal model. The means for developing the second thermal model further comprises means for measuring the performance of each component of the power plant and means for storing measured performance data. The apparatus further comprises means for receiving the measured performance data and means for processing received data to design the second thermal model.

In a further aspect, a computer program product comprising a computer useable medium having computer program logic stored thereon for enabling a processor in a computer system to process data, the computer program product comprises means for designing a first model using original specification data of a power plant, means for developing a second model from measured performance data of each component of the power plant, and means for determining the performance impact of a selected component of the power plant on the overall thermal performance of the power plant by substituting design performance data of the selected component in the first model with its measured performance data. The computer program product further comprising means for repeating the determining step until the performance impact of each component of the power-plant on the overall thermal performance of the power-plant is determined, means for displaying the performance impact of each component of the power plant on the overall thermal performance of the power plant, means for receiving original specification data, means for processing the specification data to design the first model, means for measuring the performance of each component of the power plant, means for storing measured performance data, means for receiving the stored measured performance data, and means for processing received data to design the second model.

In yet another aspect, a computer-based method for providing assistance to a user of an application program for assessing the performance impact of individual components of a power plant on overall thermal performance of the power-plant, the method comprising the steps of (a) using the application program to design a plant thermal model from original power-plant specification data, (b) using the application program to design a matched thermal plant model from measured performance data of individual components of the power-plant, (c) substituting design performance data of a selected component of the power plant in the plant thermal model with corresponding measured performance data and (d) repeating step (c) for each component of the power plant.

In a further aspect, a computer-readable medium having computer-executable instructions for performing the steps of (a) designing a first thermal model of the power plant using original specification data of the power plant; (b) developing a second thermal model of the power plant from measured performance data of each component of the power plant; and (c) determining the performance impact of a selected component of the power plant on the overall thermal performance of the power plant by substituting design performance data of the selected component in the first thermal model with its measured performance data.

The benefits of the present invention will become apparent to those skilled in the art from the following detailed description, wherein a preferred embodiment of the invention is shown and described, simply by way of illustration of the best mode contemplated of carrying out the invention.

DETAILED DESCRIPTION OF THE INVENTION

Figure 1:
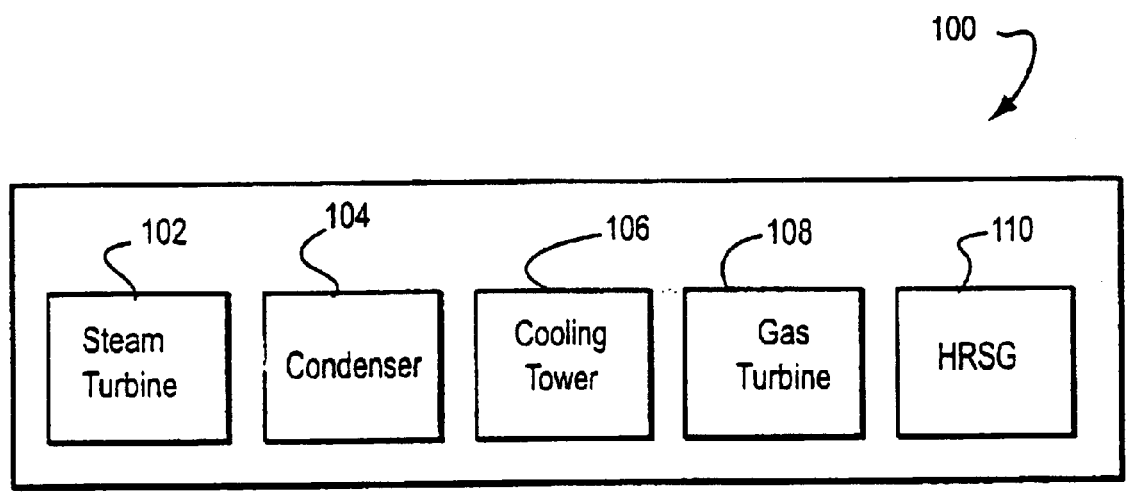
FIG. 1 is a schematic illustration of a typical combined cycle power plant with power plant components physically laid out in compliance with original specification documents.

FIG. 1 shows a typical combined cycle power plant 100 with power plant components physically laid out in compliance with original specification documents of the power plant. The power plant 100 typically includes such exemplary components as a steam turbine 102, a condenser 104, a cooling tower 106, a gas turbine 108, and a heat recovery steam generator or HRSG 110. The operational details of each of these components are generally known and are therefore not described herein.

Figure 2:
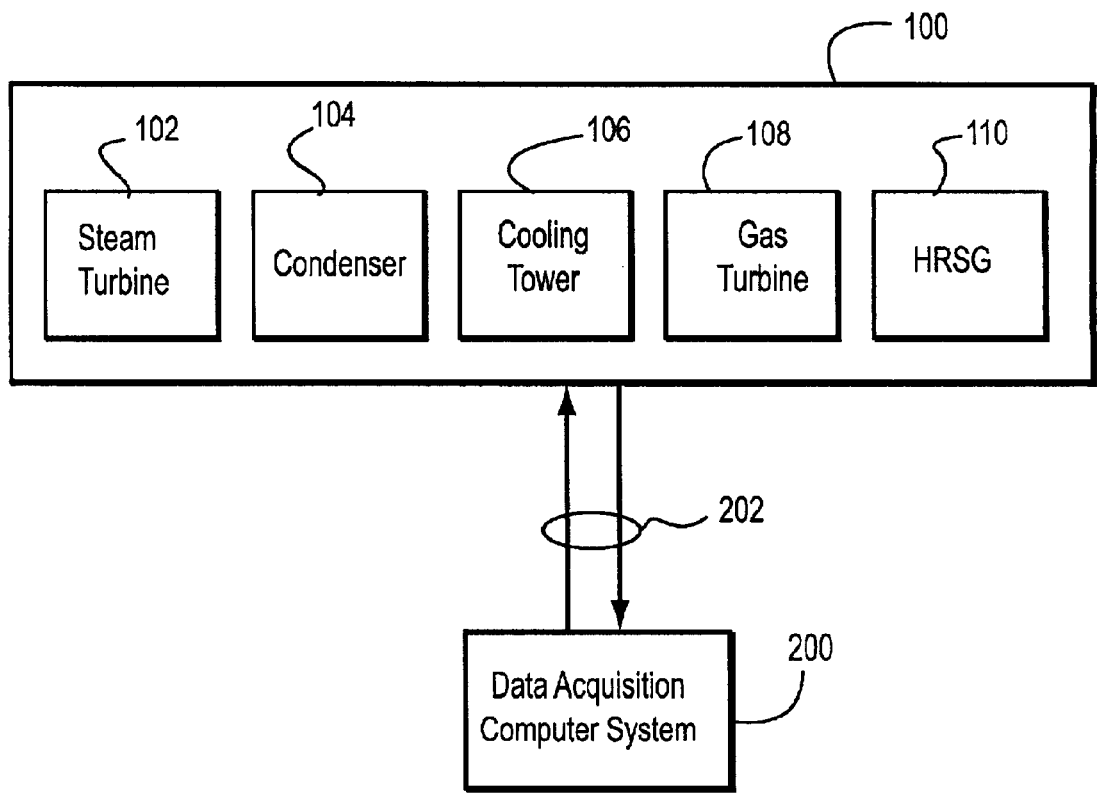
FIG. 2 illustrates an apparatus for assessing the thermal performance of individual components of the power plant, as shown in FIG. 1, in accordance with an exemplary embodiment of the present invention.

FIG. 2 shows the power plant 100 of FIG. 1 as being communicatively coupled via communication link 202 to a data acquisition computer system ("DAC System") 200 for assessing the thermal performance of individual components of the power plant in accordance with an exemplary embodiment of the present invention. The communication link 202 may be any conventional wired or wireless link. The DAC system 200 may be located within close proximity to power plant 100 or remotely therefrom. Thermal performance data of individual power plant components 102, 104, 106, 108 and 110, measured by the DAC system, are used to develop a thermal model that is matched to performance test data of the power plant. For example, measurements for compressor pressure, combustion temperature, etc. may be made in order to determine the thermal performance of the steam turbine 102. Various sensors (not shown) may be located on each of the power plant components for gathering data related to the respective power plant components and forwarding the gathered data via the wireless link 202 to the DAC system for processing the same. Likewise, other criteria relevant to the determination of thermal performance of other components may be measured by the DAC system 200.

Figure 3:
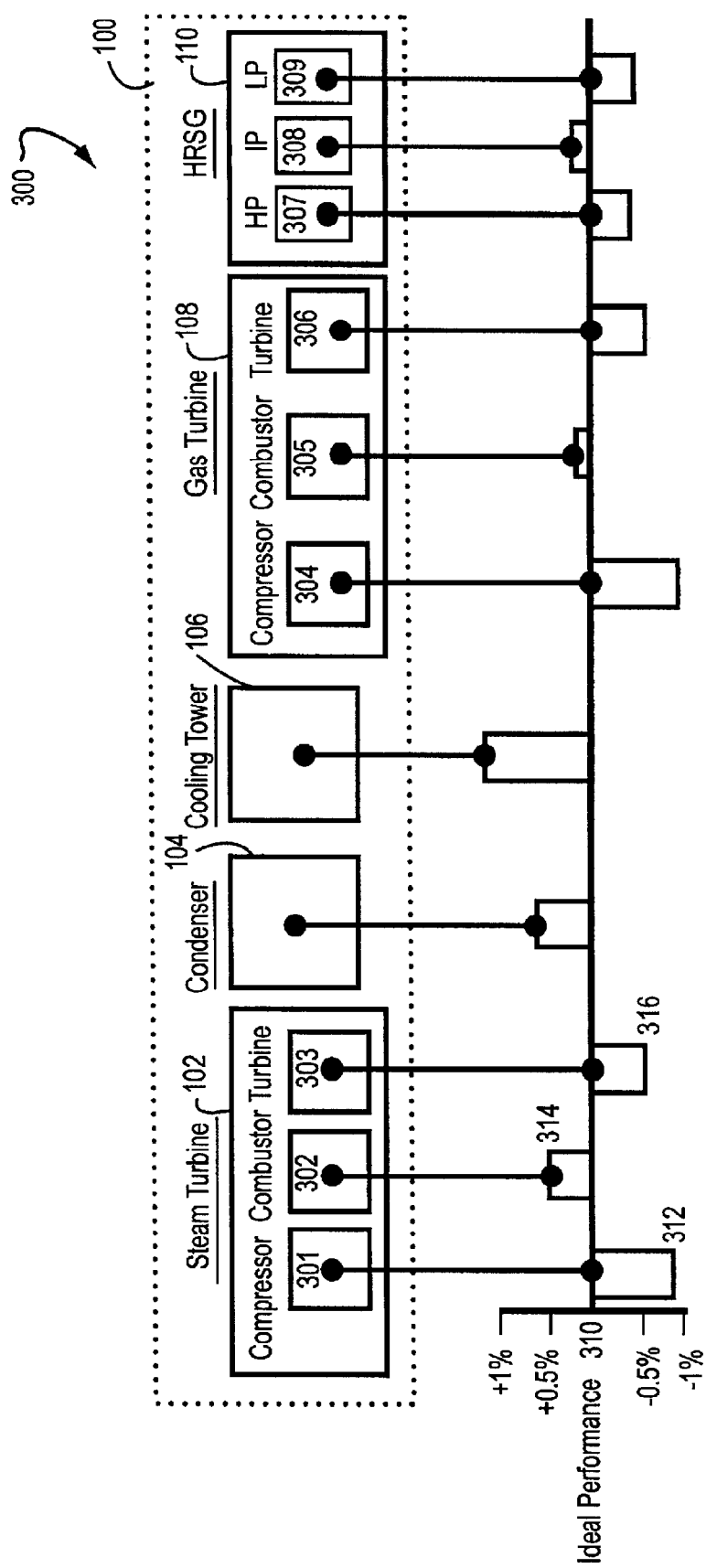
FIG. 3 illustrates schematically a thermal model of a power plant and a comparison of measured thermal performance data of each component with respective ideal thermal performance values, the thermal model being designed from measured thermal performance data of a power plant as in FIG. 1.

FIG. 3 illustrates schematically a thermal model 300 of the power plant 100 and a chart comparing thermal performance of various components and respective component parts of the power plant with corresponding ideal thermal performance values. The thermal model 300 is designed from measured thermal performance data of an operating power plant 100 (FIG. 1). The steam turbine 102 is shown to include a compressor 301, a combustor 302, and a turbine 303, and the thermal performance of each of the compressor, combustor, and turbine parts, respectively, is measured and compared with respective ideal thermal performance values. For example, if the ideal thermal performance for respective components is represented by a horizontal line 310, measured thermal performance of compressor 301 (identified at 312) is at about −1% compared to its ideal thermal performance (identified at 310). The measured thermal performance identified by 314 of combustor 302 is at about +0.5% compared to its corresponding ideal thermal performance at 310. This comparison chart may be followed in a manner as described above for other components 104, 106, 108 and 110 of power plant 100 to determine the operational efficiency of each of the components relative to their respective ideal performance values.

Figure 4:
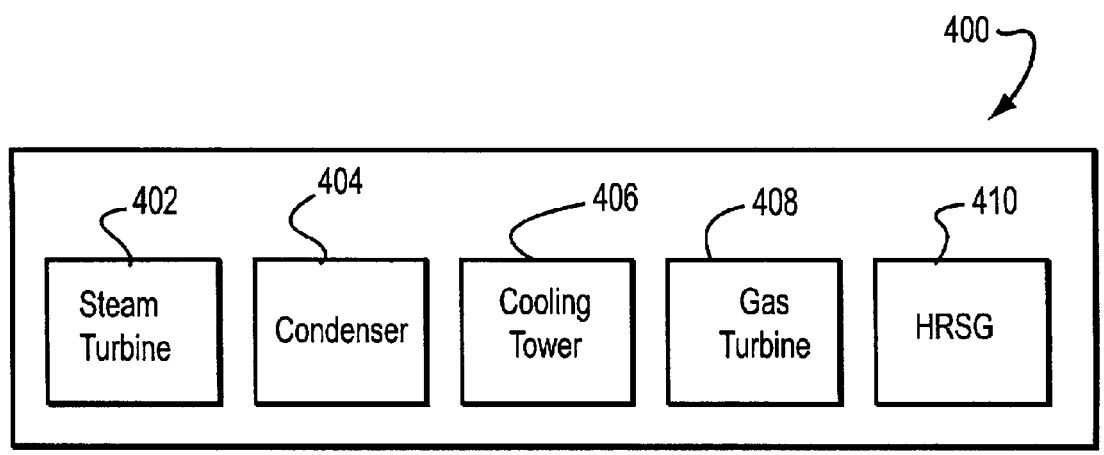
FIG. 4 illustrates schematically a thermal model of a power plant as shown in FIG. 1 but designed on a computer using original specification documents of the power plant in accordance with an exemplary embodiment of the present invention.
Figure 5:
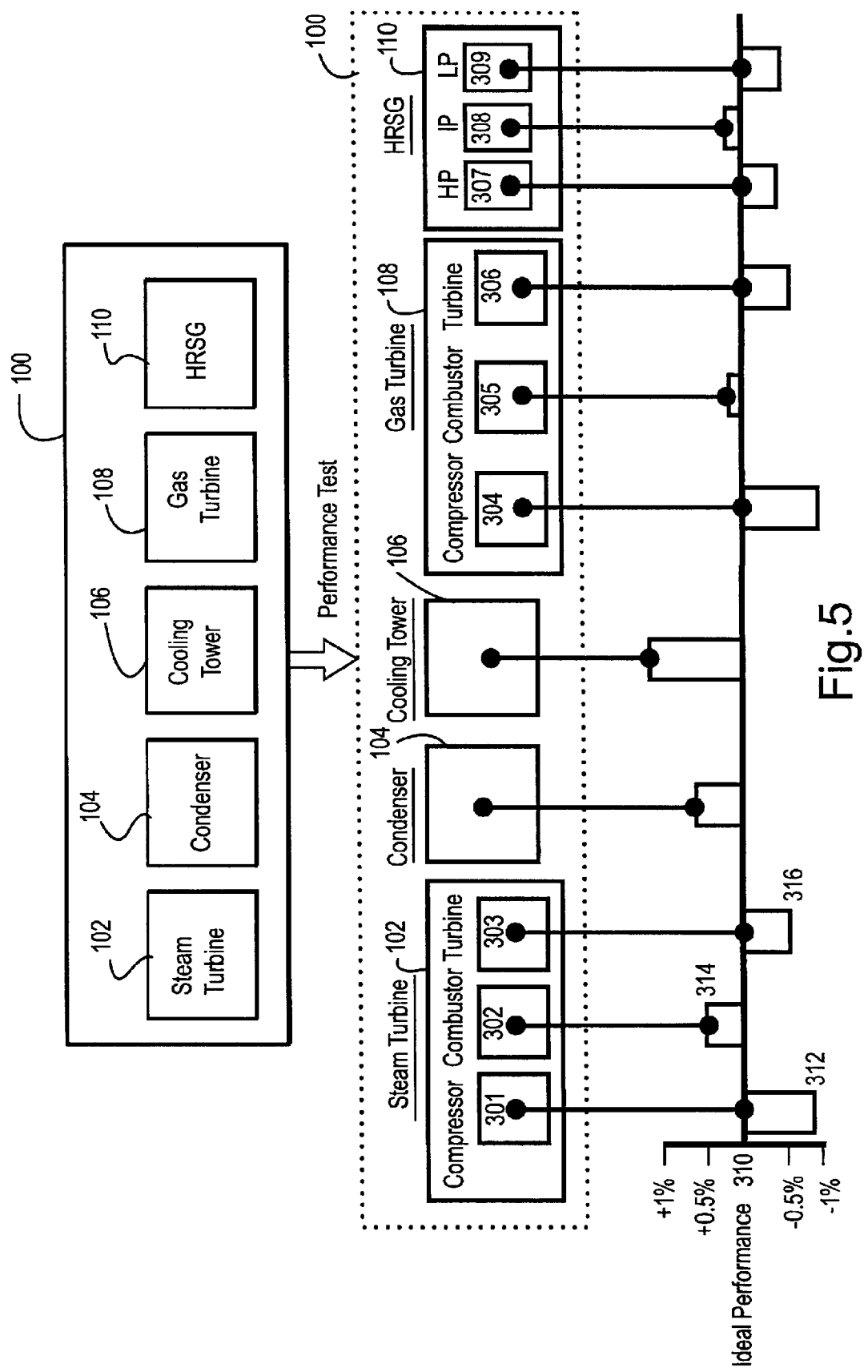
FIG. 5 illustrates a schematic for incrementally reducing the performance of the entire power plant to each of its individual components.

FIG. 4 illustrates schematically a thermal model 400 of the power plant 100 shown in FIG. 1 but designed on a computer system 500 (FIG. 5) using original specification documents of the power plant in accordance with an exemplary embodiment of the present invention. Exemplary power plant components of the design thermal model 400 include a steam turbine 402, a condenser 404, a cooling tower 406, a gas turbine 408, and a heat recovery steam generator 410. The thermal model 400 is used to determine the effect of thermal performance of a power plant component (402, 404, 406, 408 and 410) on the overall thermal performance of the power plant by substituting the designed thermal performance of the power plant component with its measured thermal performance. This process is repeated for each of the power plant components in order to determine the impact of each power plant component on the overall thermal performance of the power plant. In this manner, the entire power plant performance is reduced to performance of individual power plant components/equipment and shown in the schematic of FIG. 5. It will be appreciated that a typical combined cycle power plant may include other components than those shown herein.

Figure 6:
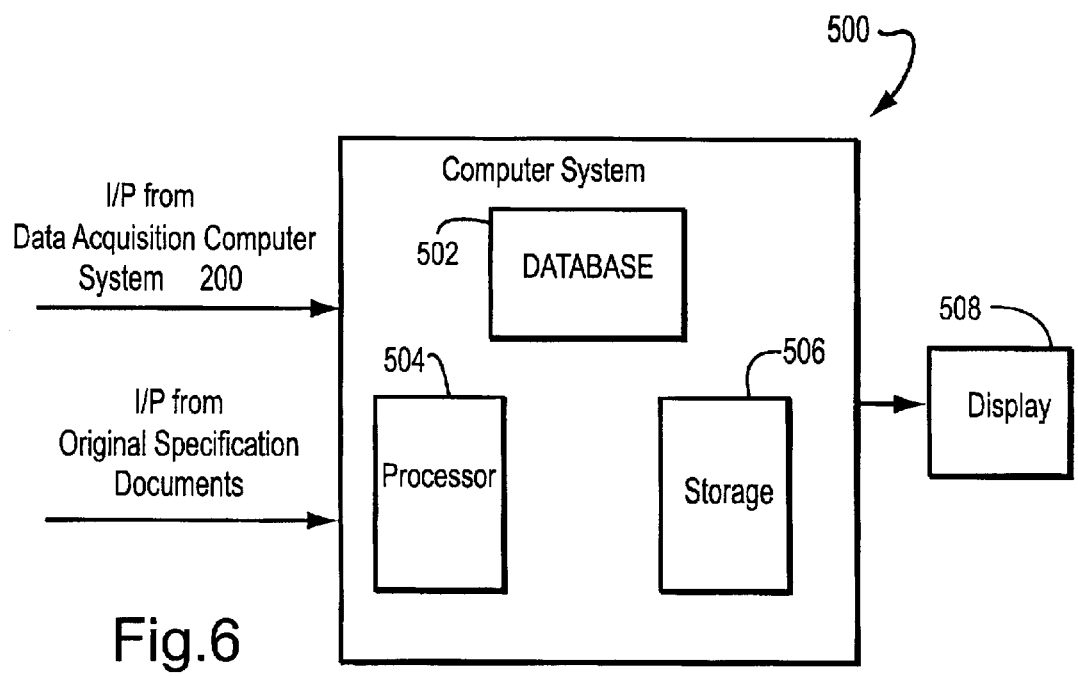
FIG. 6 illustrates a computer system for designing power-plant models as shown in FIG. 3 and FIG. 4.

FIG. 6 illustrates a computer system for designing power-plant models as in FIG. 3 and FIG. 4. The computer system 500 preferably includes a database 502, a processor 504, and a storage device 506. The database 502, which may be a part of the storage device 506, may be used to store data received from a plurality of sensors (not shown) located on one or more power plant components for measuring data related to power plant components. The storage device may be used to store ideal performance values that are predetermined for each of the power plant components. The processor 504 may be loaded with application programs that may be used for processing various tasks performed by the computer system 500. Tasks performed by the computer system 500 may include, for example, designing power-plant models, determining the overall performance of the power-plant by substituting design thermal performance data of a power plant component with its measured thermal performance data.

Also, a user of the computer system 500 may execute an application program loaded in processor 504 and design a thermal model of a power plant from original specification data of a power plant. The user may also determine the thermal performance of individual power plant components. Further, an application program may also be used by the user to determine the performance impact of a selected power plant component on the overall thermal performance of the power plant by substituting design thermal performance data with measured thermal performance data of the selected component. Thermal performance of individual power plant components and the performance impact of each power plant component on the overall thermal performance of the power plant are displayed on a display device 508.

Figure 7:
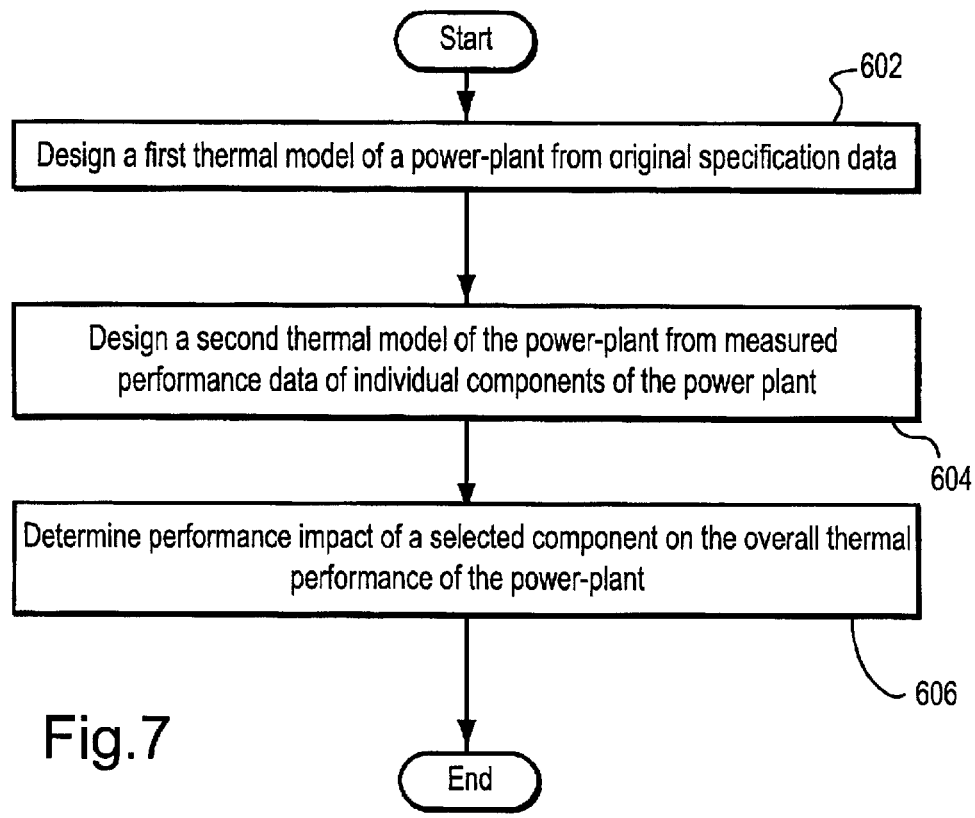
FIG. 7 is an exemplary high level flowchart illustrating process steps involved in determining the performance impact of individual components of a power plant on the overall thermal performance of the power plant in accordance with an exemplary embodiment of the present invention.

FIG. 7 shows an exemplary high level flowchart 600 illustrating process steps involved in determining the performance impact of individual power plant components on the overall thermal performance of the power plant in accordance with an exemplary embodiment of the present invention. At step 602, a first thermal model of a power plant is designed, using computer system 500 (FIG. 6), from the original specification data of each of the components of the power plant. A second thermal model of the power plant is developed from measured thermal performance data of individual components of the power plant as generally indicated at step 604. The performance impact of a selected power plant component on the overall thermal performance of the power plant is then determined by substituting design thermal performance data of the selected component with its measured thermal performance data as indicated at step 606.

Figure 8:
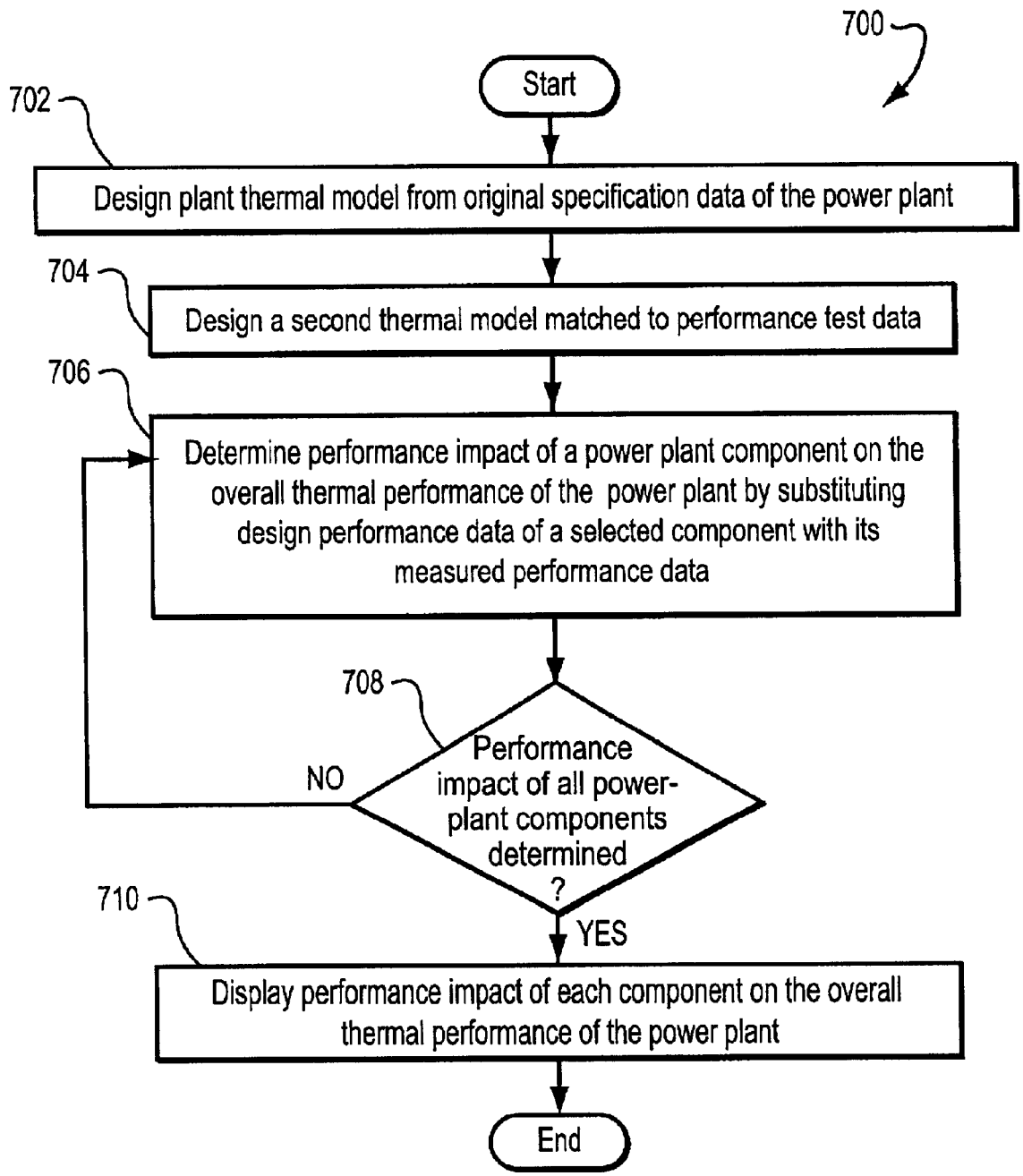
FIG. 8 is a detailed flowchart corresponding to the flowchart shown in FIG. 7.

FIG. 8 is a detailed flowchart 700 corresponding to the flowchart shown in FIG. 7. In addition to the process steps (steps 702 and 704) identified in FIG. 7, a determination is made to identify whether or not the performance impact of all the components of the power plant on the overall thermal performance of the power plant have been determined. This is generally indicated at step 706. If true ("Yes" in step 708), the performance impact of each power plant component on the overall thermal performance of the power plant is displayed on a display device as indicated at step 710. The above process is repeated until the performance impact of all the power plant components on the overall thermal performance of the power plant is determined.

Thus, as described above, in the case of a performance shortfall, the present method provides fairly accurate values for corrected performance while also indicating as to which components of the power plant are responsible for the performance shortfall. The present method thus helps to easily make decision on maintenance, repair and replacement.

Although the impact of thermal performance of individual components on the overall thermal performance of the power plant is described above, the above method may be applied to determine the overall thermal performance of a gas turbine or a steam turbine without deviating from the spirit and scope of the present invention.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

What is claimed is:

1. A method of determining performance impact of individual, components of a power plant on overall thermal performance of the power plant, the method comprising:

(a) designing a first thermal model of the power plant using original specification data of the power plant;

(b) developing a second thermal model of the power plant from measured performance data of each component of the power plant;

(c) determining the performance impact of a selected component of the power plant on the overall thermal performance of the power plant by substituting design performance data of the selected component in the first thermal model with its measured performance data; and (d) repeating step (c) until the performance impact of each component of the power plant on the overall thermal performance of the power plant is determined.

2. The method as in claim 1, further comprising:
displaying the performance impact of each component on the overall thermal performance of the power plant.

3. A method of determining performance impact of individual components of a power plant on overall thermal performance of the power plant, the method comprising:
(a) designing a first thermal model of the power plant using original specification data of the power plant;
(b) developing a second thermal model of the power plant from measured performance data of each component of the power plant; and
(c) determining the performance impact of a selected component of the power plant on the overall thermal performance of the power plant by substituting design performance data of the selected component in the first thermal model with its measured performance data;
wherein step (a) comprises:
    i. receiving original specification data in a computer system; and
    ii. processing the specification data to design the first thermal model; and
wherein step (b) comprises:
    i. measuring performance data of each component of the power plant;
    ii. storing measured performance data in a data acquisition computer;
    iii. receiving the measured performance data from the data acquisition computer in a processor system; and
    iv. processing data received in the processor system to design the second thermal model.

4. An apparatus for determining performance impact of individual components of a power plant on overall thermal performance of the power plant, comprising:
means for designing a first thermal model of the power plant using original specification data of the power plant;
means for developing a second thermal model of the power plant from measured performance data of each component of the power plant;
means for determining the performance impact of a selected component of the power plant on the overall thermal performance of the power plant by substituting design performance data of the selected component in the first thermal model with its measured performance data; and
means for repeating the determining step until the performance impact of each component of the power plant on the overall thermal performance of the power plant is determined.

5. The apparatus as in claim 4, further comprising:
means for displaying the performance impact of each component of the power plant on the overall thermal performance of the power plant.

6. An apparatus for determining performance impact of individual components of a power plant on overall thermal performance of the power plant, comprising:
means for designing a first thermal model of the power plant using original specification data of the power plant;
means for developing a second thermal model of the power plant from measured performance data of each component of the power plant;
means for determining the performance impact of a selected component of the power plant on the overall thermal performance of the power plant by substituting design performance data of the selected component in the first thermal model with its measured performance data;
means for receiving original specification data;
means for processing the specification data to design the first thermal model;
means for measuring the performance of each component of the power-plant;
means for storing measured performance data;
means for receiving the measured performance data; and
means for processing received data to design the second thermal model.

7. A computer program product comprising a computer useable medium having computer program logic stored thereon for enabling a processor in a computer system to process data, said computer program product comprising:
means for designing a first model using original specification data of a power plant;
means for developing a second model from measured performance data of each component of the power plant;
means for determining the performance impact of a selected component of the power plant on the overall thermal performance of the power plant by substituting design performance data of the selected component in the first model with its measured performance data;
means for repeating the determining step until the performance impact of each component of the power-plant on the overall thermal performance of the power-plant is determined; and
means for displaying the performance impact of each component of the power plant on the overall thermal performance of the power plant.

8. A computer program product comprising a computer useable medium having computer program logic stored thereon for enabling a processor in a computer system to process data, said computer program product comprising:
means for designing a first model using original specification data of a power plant;
means for developing a second model from measured performance data of each component of the power plant;
means for determining the performance impact of a selected component of the power plant on the overall thermal performance of the power plant by substituting design performance data of the selected component in the first model with its measured performance data; and
wherein the designing means comprises:
    means for receiving original specification data; and
    means for processing the specification data to design the first model;
wherein the developing means comprises:
    means for measuring the performance of each component of the power plant; and
    means for storing measured performance data;
means for receiving the stored measured performance data; and
means for processing received data to design the second model.

9. A computer-based method for providing assistance to a user of an application program for assessing the performance impact of individual components of a power plant on overall thermal performance of the power-plant, the method comprising the steps of:

(a) using the application program to design a plant thermal model from original power-plant specification data;

(b) using the application program to design a matched thermal plant model from measured performance data of individual components of the power-plant;

(c) substituting design performance data, of a selected component of the power plant, in the plant thermal model with its measured performance data; and (d) repeating step (c) for each component of the power plant.

10. A computer-readable medium having computer-executable instructions for performing the steps of:

(a) designing a first thermal model of the power plant using original specification data of the power plant;

(b) developing a second thermal model of the power plant from measured performance data of each component of the power plant;

(c) determining the performance impact of a selected component of the power plant on the overall thermal performance of the power plant by substituting design performance data of the selected component in the first thermal model with its measured performance data; and (d) repeating step (c) for each component of the power plant.

11. A method of determining performance impact of individual components of a power plant on overall thermal performance of the power plant, the method comprising:

(a) designing a first thermal model of the power plant using original specification data of the power plant;

(b) developing a second thermal model of the power plant from measured performance data of each component of the power plant;

(c) determining the performance impact of a selected component of the power plant on the overall thermal performance of the power plant by substituting design performance data of the selected component in the first thermal model with its measured performance data; and (d) repeating step (c) until the performance impact of at least one other selected component of the power plant on the overall thermal performance of the power plant is determined.

12. An apparatus for determining performance impact of individual components of a power plant on overall thermal performance of the power plant, comprising:

means for designing a first thermal model of the power plant using original specification data of the power plant;

means for developing a second thermal model of the power plant from measured performance data of each component of the power plant;

means for determining the performance impact of a selected component of the power plant on the overall thermal performance of the power plant by substituting design performance data of the selected component in the first thermal model with its measured performance data; and means for repeating the determining step until the performance impact of at least one other component of the power plant on the overall thermal performance of the power plant is determined.

13. A computer-based method for providing assistance to a user of an application program for assessing the performance impact of individual components of a power plant on overall thermal performance of the power-plant, the method comprising the steps of:

(a) using the application program to design a plant thermal model from original power-plant specification data;

(b) using the application program to design a matched thermal plant model from measured performance data of individual components of the power-plant;

(c) substituting design performance data, of a selected component of the power plant, in the plant thermal model with its measured performance data; and (d) repeating step (c) for at least one other selected component of the power plant.

* * * * *